(12) United States Patent
Titmus

(10) Patent No.: US 8,799,112 B1
(45) Date of Patent: Aug. 5, 2014

(54) INTERACTIVE MAP FOR BROWSING ITEMS

(75) Inventor: Brandon D. Titmus, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 507 days.

(21) Appl. No.: 12/966,270

(22) Filed: Dec. 13, 2010

(51) Int. Cl.
*G06F 17/30* (2006.01)

(52) U.S. Cl.
USPC ........................................ 705/27.2; 705/26.62

(58) Field of Classification Search
USPC ........................................ 705/26.1, 27.1, 27.2
See application file for complete search history.

(56) References Cited

U.S. PATENT DOCUMENTS

| | | | |
|---|---|---|---|
| 6,629,079 B1 * | 9/2003 | Spiegel et al. | 705/26.7 |
| 7,403,910 B1 * | 7/2008 | Hastings et al. | 705/26.1 |
| 7,617,127 B2 * | 11/2009 | Hunt et al. | 705/26.61 |
| 8,271,338 B2 * | 9/2012 | Hunt et al. | 705/26.8 |
| 8,365,235 B2 * | 1/2013 | Hunt et al. | 725/88 |
| 2005/0125307 A1 * | 6/2005 | Hunt et al. | 705/26 |
| 2008/0010173 A1 * | 1/2008 | Rendich et al. | 705/28 |
| 2008/0141317 A1 * | 6/2008 | Radloff et al. | 725/87 |
| 2009/0019010 A1 * | 1/2009 | Takeya | 707/3 |
| 2009/0158326 A1 * | 6/2009 | Hunt et al. | 725/38 |
| 2010/0010877 A1 * | 1/2010 | Hunt et al. | 705/10 |
| 2010/0251305 A1 * | 9/2010 | Kimble et al. | 725/46 |
| 2011/0145327 A1 * | 6/2011 | Stewart | 709/203 |
| 2012/0096013 A1 * | 4/2012 | Ciancutti et al. | 707/749 |

OTHER PUBLICATIONS

Netflix, http://web.archive.org/web/20091225091712/http://www.netflix.com/browseselection, dated Dec. 25, 2009.*
Literature-Map, http://www.literaturemap.com/patrick+mcmanus.html, last visited Dec. 13, 2010.
Amazon.com, Amazon Windowshop Beta, http://www.windowshop.com, Oct. 21, 2010.

* cited by examiner

*Primary Examiner* — Mark Fadok
(74) *Attorney, Agent, or Firm* — Thomas | Horstemeyer, LLP

(57) ABSTRACT

Disclosed are various embodiments for generating interactive maps for browsing items in a catalog. A first map of items that includes graphical representations of each one of a first set of items is generated. A selected item is determined according to a selection of one of the graphical representations of the first set of items. A second set of items is determined based at least in part on similarity of the second set of items to the selected item. A second map of items that includes graphical representations of each one of the second set of items is generated. The graphical representations of each one of the second set of items are arranged in the second map of items relative to the graphical representation of the selected item based at least in part on a corresponding degree of similarity of the respective item to the selected item.

23 Claims, 8 Drawing Sheets

INTERACTIVE MAP FOR BROWSING ITEMS

BACKGROUND

Online retailers may offer a wide selection of items for sale. Customers may locate items in which they are interested, for example, by entering a query in a search engine, browsing through a taxonomy of item categories, navigating to an item detail page, and so on. The home page of the online retailer may list an assortment of popular items in order to promote those items to customers. Although many customers might not be interested in such items, the listing of popular items may pique the interest of some customers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating interactive maps for browsing items. With a wide variety of items offered for sale online, customers may have difficulty locating items in which they are interested. Various embodiments of the present disclosure provide user interfaces for an interactive form of "window shopping" by facilitating the browsing of items through interactive graphical maps. When a customer first visits a network site, an interactive map showing graphical representations of popular and/or best-selling items may be presented. If the customer is interested in an item, he or she may click on the graphical representation of the item for additional information.

An option may be provided to redraw the interactive map to include items that are similar to the selected item and/or that are relevant to the particular customer. The proximity of the items to the selected item on the map may be determined in part based on the degree of similarity of the similar items to the selected item. In some embodiments, the sizes of the graphical representations of the similar items may vary based on the degree of similarity of the similar items. In the following discussion, a general description of the system and its components is provided, followed by a discussion of the operation of the same.

Figure 1:
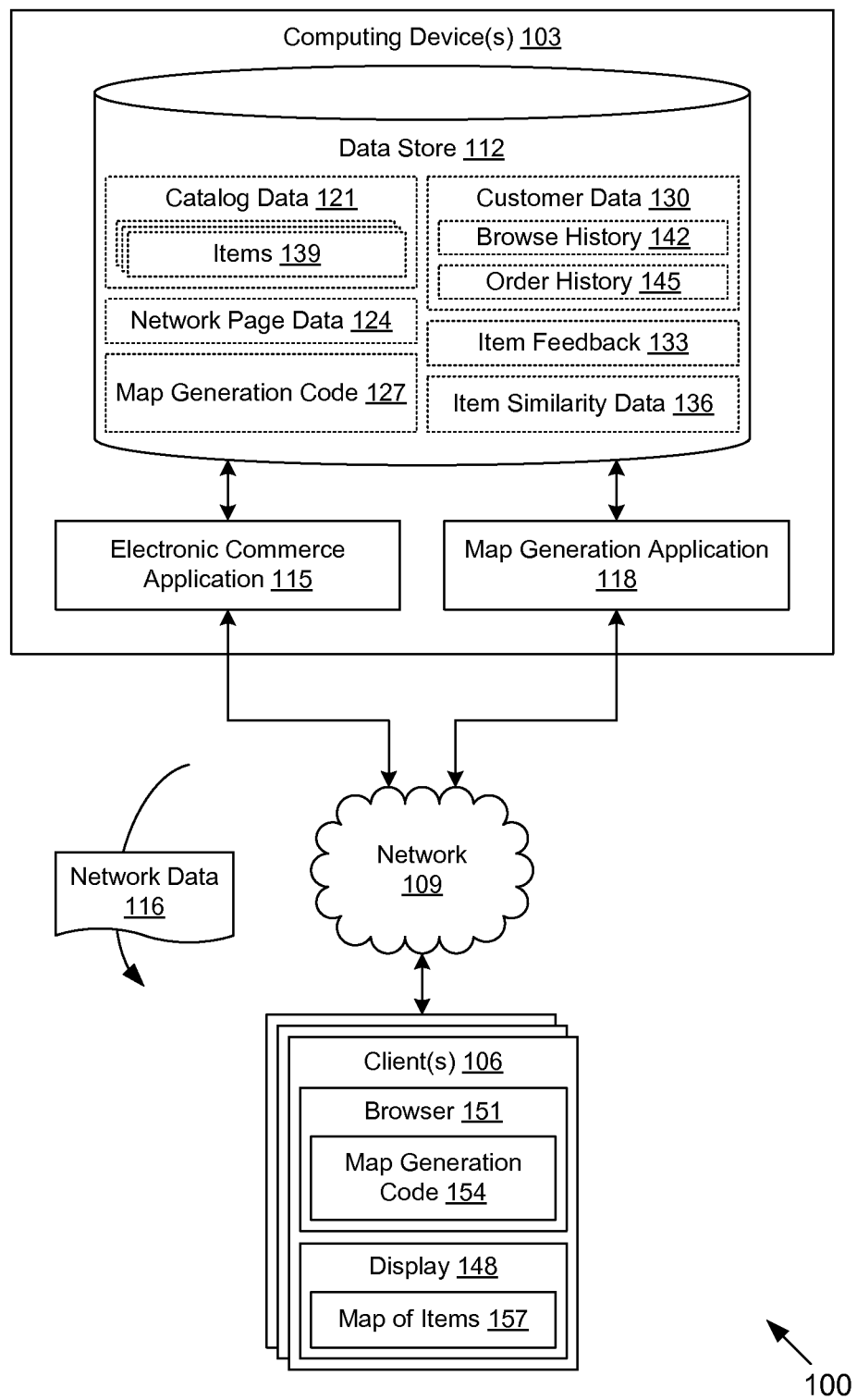
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include an electronic commerce application 115, a map generation application 118, and other applications, services, processes, systems, engines, or functionality not discussed in detail herein. The electronic commerce application 115 is executed to facilitate the online purchase of items from an electronic marketplace over the network 109. The electronic commerce application 115 also performs various backend functions associated with the online presence of an electronic marketplace in order to facilitate the online purchase of items. For example, the electronic commerce application 115 generates network pages such as, for example, web pages and/or other types of network content that are provided to clients 106 for the purposes of promoting and selecting items for purchase, rental, download, lease, or any other forms of consumption. The network pages are sent to the client 106 over the network 109 as network data 116.

The map generation application 118 is executed to generate interactive maps of items. An initial map of items generated by the map generation application 118 may be composed from best selling items, most viewed items, most referred items, highest rated items, and/or other subsets of an item catalog. In some embodiments, the items are selected based at least in part on personalization data associated with the customer requesting the map of items. Subsequent maps of items may be generated by the map generation application 118 to customize the map in response to a customer selection of an item. For instance, when a customer selects an item on the initial map, the map may be redrawn to include items that are similar to the selected item and/or items that are especially relevant for that customer. The items may be arranged in proximity to the selected item on the map based on degree of similarity to the selected item and/or other factors. The map generation application 118 is configured to send network data 116 including map-related data to the client 106 for rendering.

The data stored in the data store 112 includes, for example, catalog data 121, network page data 124, map generation code 127, customer data 130, item feedback 133, item similarity data 136, and potentially other data. The catalog data 121 includes a plurality of items 139 offered by one or more sellers through an electronic marketplace. An item 139 may refer to a product, good, service, software download, multimedia download, social networking profile, or any combination, bundle, or package thereof, that may be offered for sale, purchase, rental, lease, download, and/or any other form of consumption as can be appreciated. The various data stored in catalog data 121 may include, for example, titles, descriptions, quantities, conditions, images, options, weights, customer reviews, customer ratings, keywords, shipping restrictions, prices, tax classifications, unique identifiers, and any other data related to items 139. Each of the items 139 may be associated with one or more item categories as desired.

The network page data 124 includes various data related to the generation of network pages. The network page data 124 may include, for example, text, templates, code, graphics, images, audio, animations, multimedia, and/or other data used in generating network pages. The map generation code 127 corresponds to code that is sent to the client 106 to facilitate client-side rendering of interactive maps as generated by the map generation application 118. Such map generation code 127 may include Flash, JavaScript, VBScript, Ajax, cascading style sheets (CSS), hypertext markup language (HTML), extensible markup language (XML), and/or other code.

The customer data 130 includes various data associated with customers or buyers in the electronic marketplace. To this end, the customer data 130 may include, for example, browse history 142, order history 145, and/or other data. The browse history 142 records items 139 that the customer has viewed, selected, searched for, or otherwise indicated a preference for when browsing a network site associated with the electronic marketplace. The order history 145 may include data relating to previous orders placed by the customer, dates on which the orders were placed, items 139 purchased, prices paid, shipping methods, shipping addresses, and so on.

The item feedback data 133 includes data relating to customer feedback for items 139. The item feedback data 133 may indicate a customer rating for each of the items 139, for example, on a scale from zero to five stars, or some other scale. The item similarity data 136 includes data describing similarity relationships among items 139. For example, items 139 may be considered similar if they are in the same genre, have the same manufacturer (and/or author, publisher, producer, director, designer, etc.), have similar titles and/or other descriptions, were purchased together, were viewed together, and so on. Also, a first item 139 may be similar to a second item 139 if the first item 139 is an accessory or alternate for the second item 139. Similar items 139 may be determined based on the items 139 that a customer has viewed before ultimately purchasing another item 139. The similarity relationship between two items 139 may be expressed, for example, by a degree of similarity or another measure. Thus, two items 139 may have a high degree of similarity, while two other items 139 may have a weak degree of similarity.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 148. The display 148 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 151 and/or other applications. The browser 151 may be executed in a client 106, for example, to access and render network pages, such as web pages, or other network content served up by the computing device 103 and/or other servers, thereby generating a rendered network page on the display 148. Additionally, the browser 151 may be configured to execute map generation code 154 to generate and render a map of items 157 on the display 148. The client 106 may be configured to execute applications beyond the browser 151 such as, for example, email applications, instant message applications, and/or other applications.

Next, a general description of the operation of the various components of the networked environment 100 is provided. To begin, customers at clients 106 interact with a network site of an electronic marketplace through the electronic commerce application 115. Through customers browsing the network site and/or placing orders for items 139, the electronic commerce application 115 is able to generate customer data 130, including the browse history 142, order history 145, and/or other data.

Some customers may desire an alternate interface for browsing items 139 in the catalog. To this end, a customer at a client 106 may send a request for a network page over the network 109 to the map generation application 118, which serves up a network page in network data 116 that includes code and data for rendering the map of items 157. Various embodiments are contemplated for implementing the map of items 157. In a first embodiment, the map of items 157 may correspond to one or more images generated by the map generation application 118 and sent to the client 106 for rendering on the display 148. Updates to the map of items 157 may be accomplished through images on subsequent network pages. In a second embodiment, the map of items 157 may be generated and updated, at least in part, in the client 106 according to map generation code 127 and/or data obtained from the map generation application 118. Such an embodiment may utilize Ajax, dynamic HTML (DHTML), simple object access protocol (SOAP), and/or other technologies. Updates may be made by data exchange of the map generation code 154 with the map generation application 118 over the network 109. It is understood that many such embodiments may be employed according to the principles of the present disclosure, with varying proportions of processing being performed on the server side or on the client side.

The map of items 157 includes representations of a number of items 139 arrayed in a layout that makes for easy browsing. In various embodiments, the representations are graphical representations, such as images of the items 139, images associated with the items 139, placeholder icons associated with the items 139, and so on. The representations of the items 139 may be arranged, for example, in a grid layout, according to item categories. As a non-limiting example, a first axis might correspond to item categories, and the second axis might correspond to items 139 in those categories. Item categories may include, for example, books, music, movies and television shows, video games, apparel, electronics, etc.

The initial map of items 157 that is rendered for a customer may include assortments of items 139 that are popular, highly rated, recommended, best selling, etc. Such items 139 may be determined, for example, with reference to customer data 130 in the aggregate, item feedback 133, and other data. In some embodiments, the initial map of items 157 may be personalized for a customer based on the particular browse history 142, order history 145, and/or other data of the customer. To this end, the customer may be identified by the map generation application 118 prior to generating the map of items 157. The identification may be made through explicit login, cookies, internet protocol (IP) address, and/or other approaches. In one embodiment, the content of the initial map of items 157 is customized for a geographic area or other demographic associated with the particular customer.

The customer is able to select a representation of the item 139 in the map of items 157. Such a selection is provided to the map generation code 154 and/or the map generation application 118. In one embodiment, a detail window with additional information about the selected item 139 may be rendered on the display 148. Such a detail window may include, for example, further description of the item 139, multimedia associated with the item 139, and/or other information. From the detail window, the customer may be able to initiate an update of the map of items 157 based on the selected item 139. In various embodiments, the customer may initiate an update of the map of items 157 merely by clicking on the representation of the item 139 and/or selecting a component associated with the representation of the item 139.

The map of items 157 is updated by the map generation application 118 and/or the map generation code 154 based at least in part on the selected item 139. The map generation application 118 determines items 139 that are similar to the item 139 based at least in part on the item similarity data 136 and/or other data. The resulting set of items 139 may also be personalized based upon the customer data 130. An updated map of items 157 is then rendered on the display 148. In the updated map of items 157, the representations of the similar items 139 are arranged relative to the representation of selected item 139 based at least in part on a degree of similarity of each item 139 to the selected item 139. Thus, representations of items 139 that are more similar to the selected item 139 may be arranged nearer to the representation of the selected item 139 than representations of items 139 that are less similar to the selected item 139.

In one embodiment, the sizes of the representations may be established based at least in part on the degree of similarity. For example, items 139 that are more similar to the selected item 139 may have a larger representation than items 139 that are less similar to the selected item 139. Also, in the updated map of items 157, the items 139 that are chosen and how they are represented in the map of items 157 may also be personalized for the customer. Thus, items 139 that are strongly similar to the selected item 139 and are relevant to the customer according to the customer data 130 may be represented nearest the selected item 139.

For every set of items 139 identified to be included in the map of items 157, it may be that a portion or subset of the items 139 may be included within a viewport of the browser 151 on the display 148. Consequently, scrolling and/or other navigation may be enabled for rendering other ones of the set of items 139 that are included in the map of items 157 in the viewport. When representations of previously non-visible items 139 are brought into view, additional network data 116 may be acquired. However, the data corresponding to the representations of previously non-visible items 139 may also be cached in the client 106.

Figure 2:
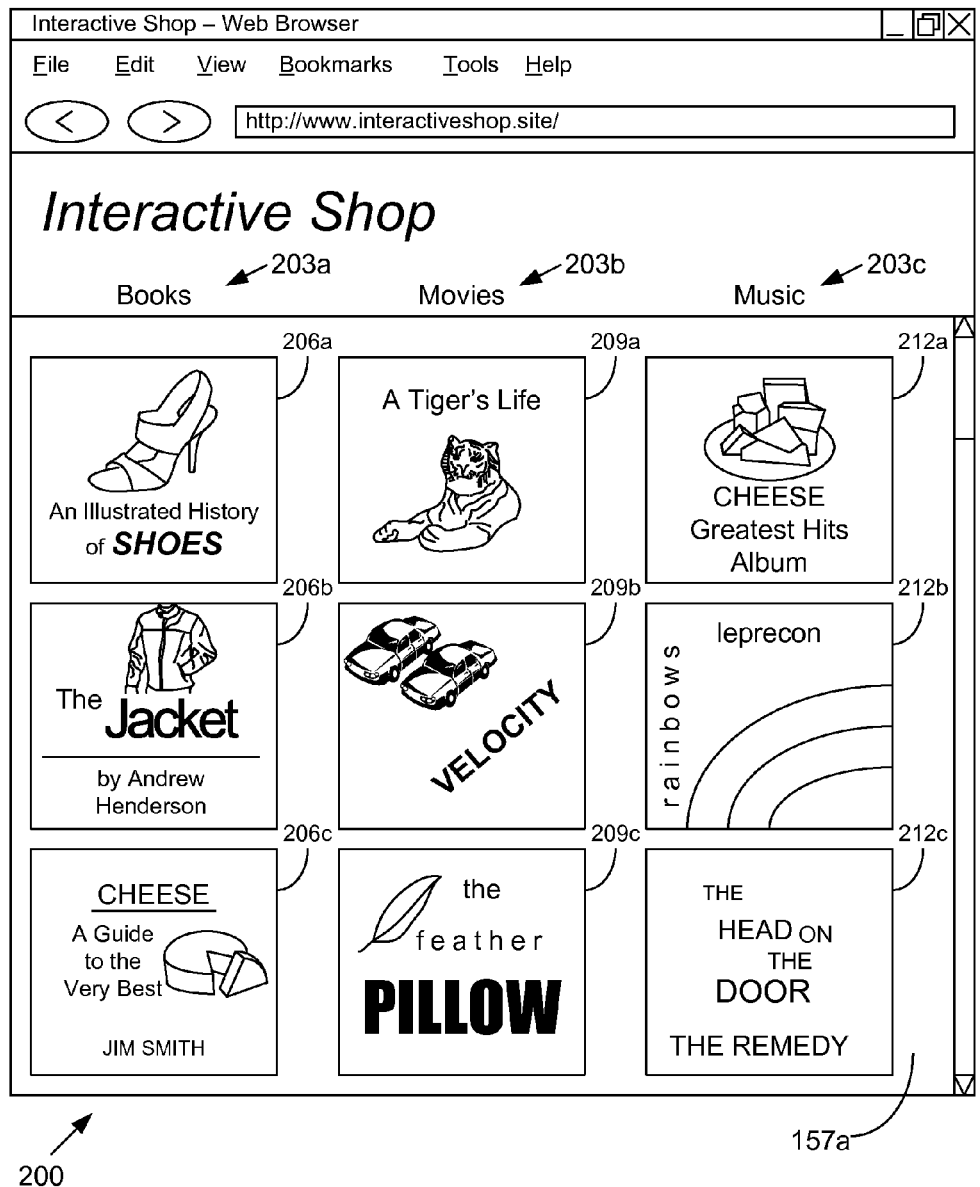
FIGS. 2-6 are drawings of examples of user interfaces rendered by a client in the networked environment of FIG. 1 according to various embodiments of the present disclosure.

Turning now to FIG. 2, shown is one example of a user interface 200 rendered in a client 106 (FIG. 1) in the networked environment 100 (FIG. 1). The user interface 200 corresponds to a map of items 157a rendered on a display 148 (FIG. 1). Although in this example the map of items 157a is within a viewport of the browser 151 (FIG. 1), it is understood that the map of items 157a may be displayed full screen, on multiple screens, or according to some other display arrangement.

The map of items 157a corresponds to an initial map of items 157a that is rendered before a customer has selected an item 139 (FIG. 1). Such items 139 may be chosen at random, according to best sellers, according to order history 145 (FIG. 1) and browse history 142 (FIG. 1), and/or according to other approaches. The map of items 157a is arranged into a grid according to three item categories 203a, 203b, and 203c, corresponding to "Books," "Movies," and "Music" respectively.

The item representations 206a, 206b, and 206c correspond to the items 139 associated with the "Books" item category 203a. Such item representations 206 may be cover images of the corresponding books and/or other promotional graphics. The item representations 209a, 209b, and 209c correspond to the items 139 associated with the "Movies" item category 203b. Such item representations 209 may be logos, poster images, video package images, and/or other promotional images. The item representations 212a, 212b, and 212c correspond to the items 139 associated with the "Music" item category 203c. Such item representations 209 may be compact disc cover images and/or other promotional images.

In various embodiments, the item representations 206, 209, 212 may be displayed in conjunction with customer ratings. In one embodiment, the item representations 206, 209, 212 may be surrounded by a frame indicating the user rating. For example, a gold frame may indicate a high customer rating for the item 139, while a red frame may indicate a poor customer rating for the item 139. In another embodiment, a set of star icons may be displayed to show a star rating associated with the item 139.

Figure 3:
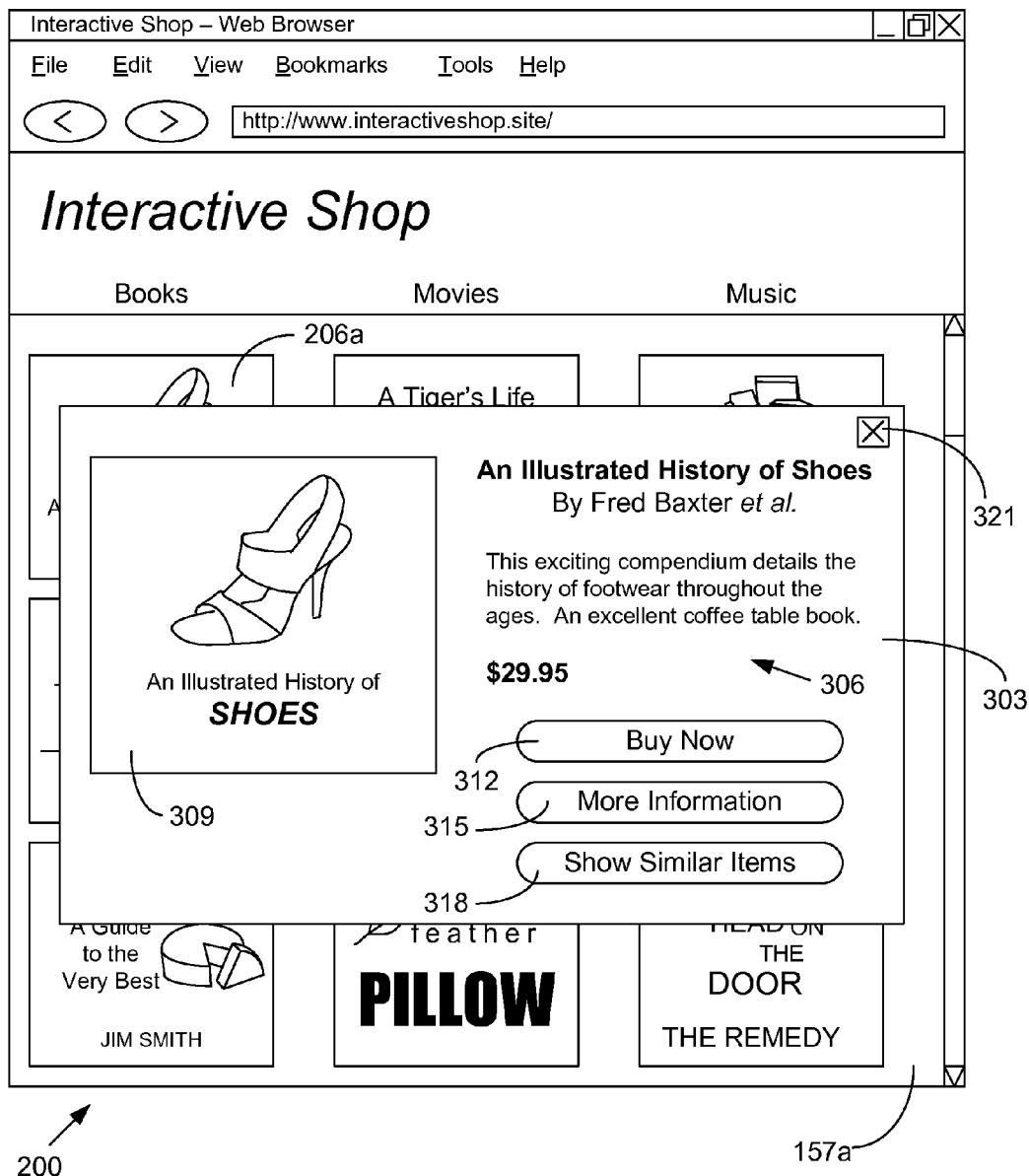

Continuing on to FIG. 3, shown is another example of a user interface 200 rendered in a client 106 (FIG. 1) in the networked environment 100 (FIG. 1). The user interface 200 corresponds to the map of items 157a from FIG. 2, where the item representation 206a corresponding to the item 139 (FIG. 1) of a book titled "An Illustrated History of Shoes" has been selected and a detail window 303 is shown. The item representation 206a may have been selected by single clicking the item representation 206a, double clicking the item representation 206a, hovering over the item representation 206a, selecting a button, and/or through other forms of user input on the client 106.

The detail window 303 includes additional information 306 about the corresponding item, with information such as, for example, title, author, description, price, etc. The detail window 303 may include multimedia 309 associated with the item 139, such as images, video clips, audio clips, and so on. The detail window 303 also may include a buy component 312, a more information component 315, and a show similar items component 318. The buy component 312 may be used for initiating an order for the item 139 through the electronic commerce application 115. The more information component 315 may be used for requesting a detail network page with more information about the item 139, such as customer reviews, additional images, and so on. The show similar items component 318 may be used for redrawing the map of items 157a to include items that are similar to the selected item 139. The detail window 303 may also include a close component 321 for dismissing the detail window 303 and returning to the map of items 157a.

Figure 4:
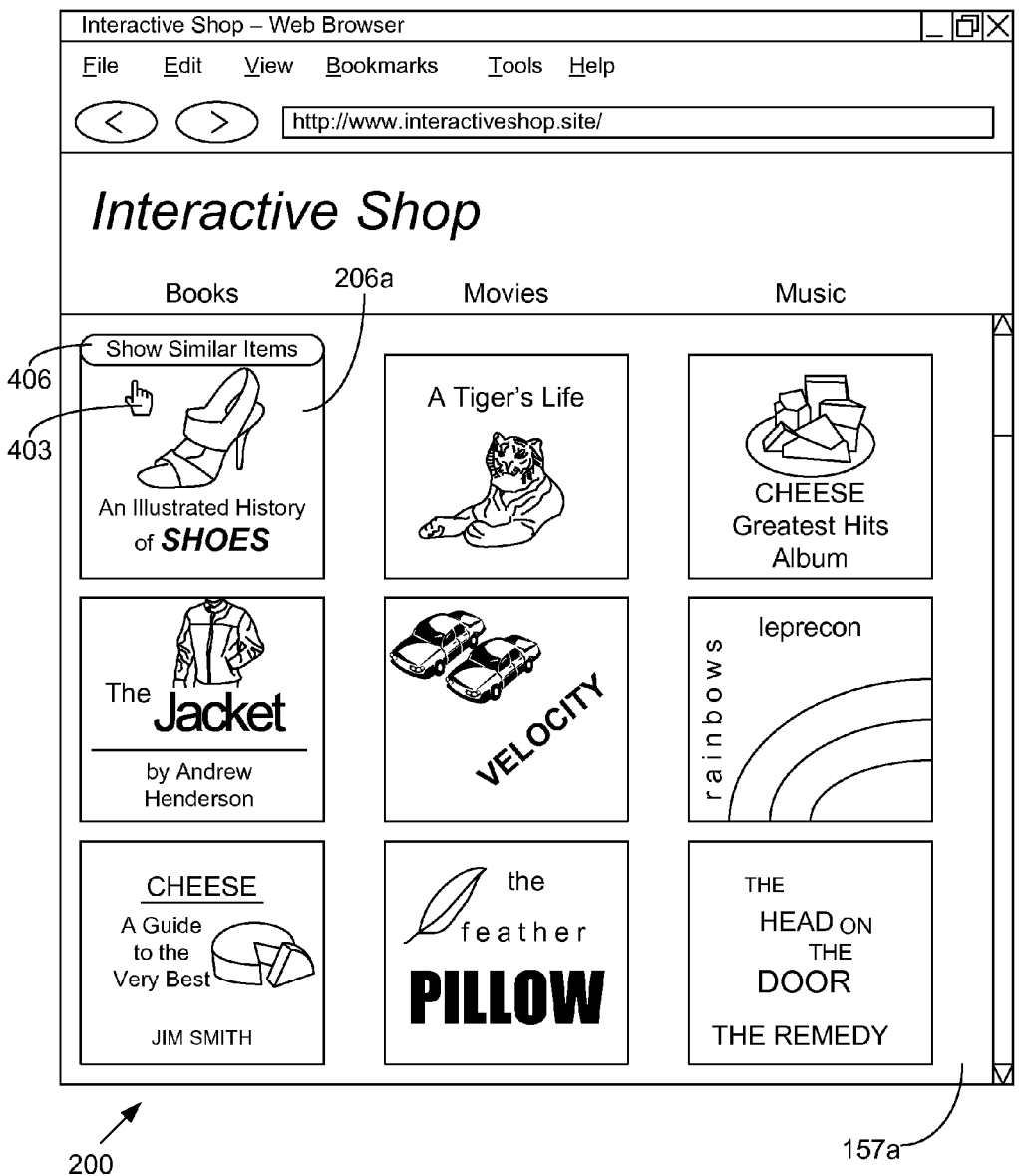

Moving on to FIG. 4, shown is another example of a user interface 200 rendered in a client 106 (FIG. 1) in the networked environment 100 (FIG. 1). The user interface 200 again corresponds to the map of items 157a from FIG. 2. The customer at the client 106 has placed a cursor 403 above the item representation 206a. By hovering over the item representation 206a, a show similar items component 406 associated with the item 139 (FIG. 1) is made visible. The show similar items component 406 may be used for redrawing the map of items 157a to include items that are similar to the selected item 139. In other examples, the show similar items component 406 may be initially visible adjacent to, or as part of, the item representation 206a.

Figure 5:

Referring next to FIG. 5, shown is another example of a user interface 200 rendered in a client 106 (FIG. 1) in the networked environment 100 (FIG. 1). The user interface 200 corresponds to a map of items 157b that represents an update to the map of items 157a from FIG. 2. In FIG. 5, the map of items 157b is updated to include items 139 (FIG. 1) that are similar to the item 139 ("An Illustrated History of Shoes") associated with a selected item representation 206a from FIG. 2. Item representations 506a and 506b in the item category 203a, item representations 509a, 509b, and 509c in the item category 203b, and item representations 512a, 512b, and 512c in the item category 203c correspond to the similar items 139.

The representations of the similar items 139 are arranged in proximity to the selected item representation 206a according to a degree of similarity. The representations of the similar items 139 may also be arranged in proximity to the selected item representation 206a based in part on relevance to the customer according to the customer data 130 (FIG. 1). Although representations of eight similar items 139 are shown in FIG. 5, it is understood that representations of additional similar items 139 may be made visible by scrolling down or in a different direction.

In the example of FIG. 5, the item representation 506a corresponding to "An Illustrated History of Shoes, Second Edition" is shown closer to the selected item representation 206a than the item representation 506b corresponding to "An Illustrated History of Fashion." This arrangement may be made because "An Illustrated History of Shoes, Second Edition" has a higher degree of similarity to "An Illustrated History of Shoes" than "An Illustrated History of Fashion" has to "An Illustrated History of Shoes, Second Edition."

A show previously displayed items component 509 may be provided for reverting back to the map of items 157a shown in FIG. 2. It is understood that any of the representations of items 139 shown in the map of items 157b may also be selected and used for generating yet another map of items 157 if desired. The show previously displayed items component 509 may be present in other updated maps of items 157 in order to revert to the previous map of items 157 and/or the initial map of items 157.

In various embodiments, navigation among multiple maps of items 157 may be non-linear. In one such embodiment, a user may be able to select a map of items 157 from a list of previously rendered maps of items 157. As a non-limiting example, a docking component may be provided in the user interface 200 such that a user may be able to save a currently rendered map of items 157 to the docking component, thereby adding a corresponding element to the docking component. Accordingly, the user may return to that map of items 157 later by selecting the corresponding element in the docking component. This feature may also be referred to as saving a current state of the map of items 157 such that the state may be selected later in a user interface for selecting a state from multiple saved states of the map of items 157.

Figure 6:
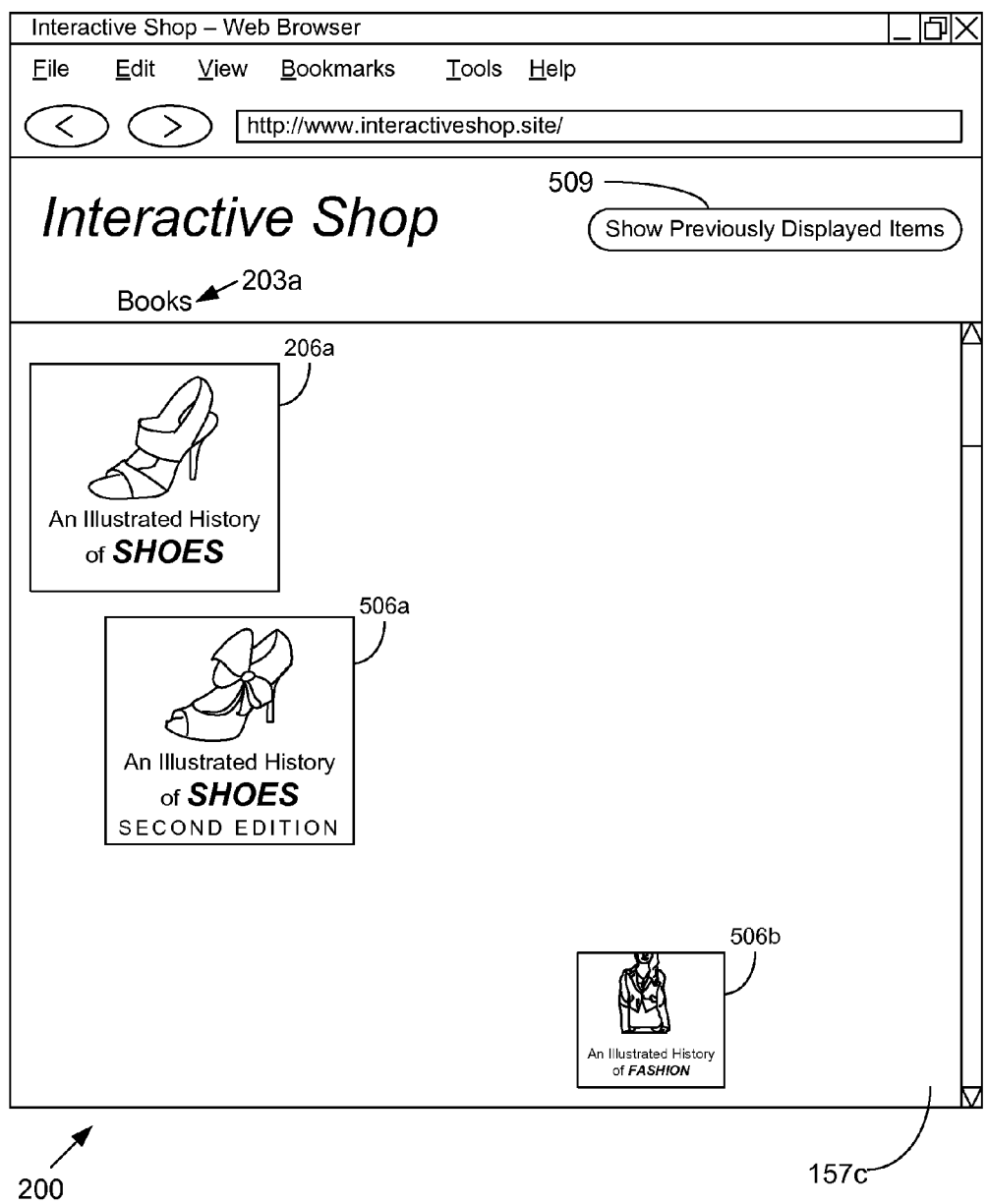

With reference to FIG. 6, shown is another example of a user interface 200 rendered in a client 106 (FIG. 1) in the networked environment 100 (FIG. 1). The user interface 200 corresponds to a map of items 157c that also represents an update to the map of items 157a from FIG. 2. In FIG. 6, the map of items 157c is updated to include items 139 (FIG. 1) that are similar to the item 139 ("An Illustrated History of Shoes") associated with a selected item representation 206a from FIG. 2. Item representations 506a and 506b in the item category 203a correspond to the similar items 139. Item categories 203b and 203c have been omitted from FIG. 6 to simplify this example.

In contrast to the map of items 157b (FIG. 5), the sizes of the item representations 506a and 506b vary with the degree of similarity. In addition, the distance of the item representations 506a and 506b from the selected item representation 206a vary with the degree of similarity, though other embodiments may omit a distance or proximity relationship. Because the item 139 associated with the item representation 506a is more relevant than the item 139 associated with the item representation 506b, item representation 506a is rendered with a relatively larger size than item representation 506b. It is noted that, in this embodiment, a grid layout is not used. Radial layouts, spiral layouts, and/or other layouts may be employed for the map of items 157 as desired.

Figure 7:
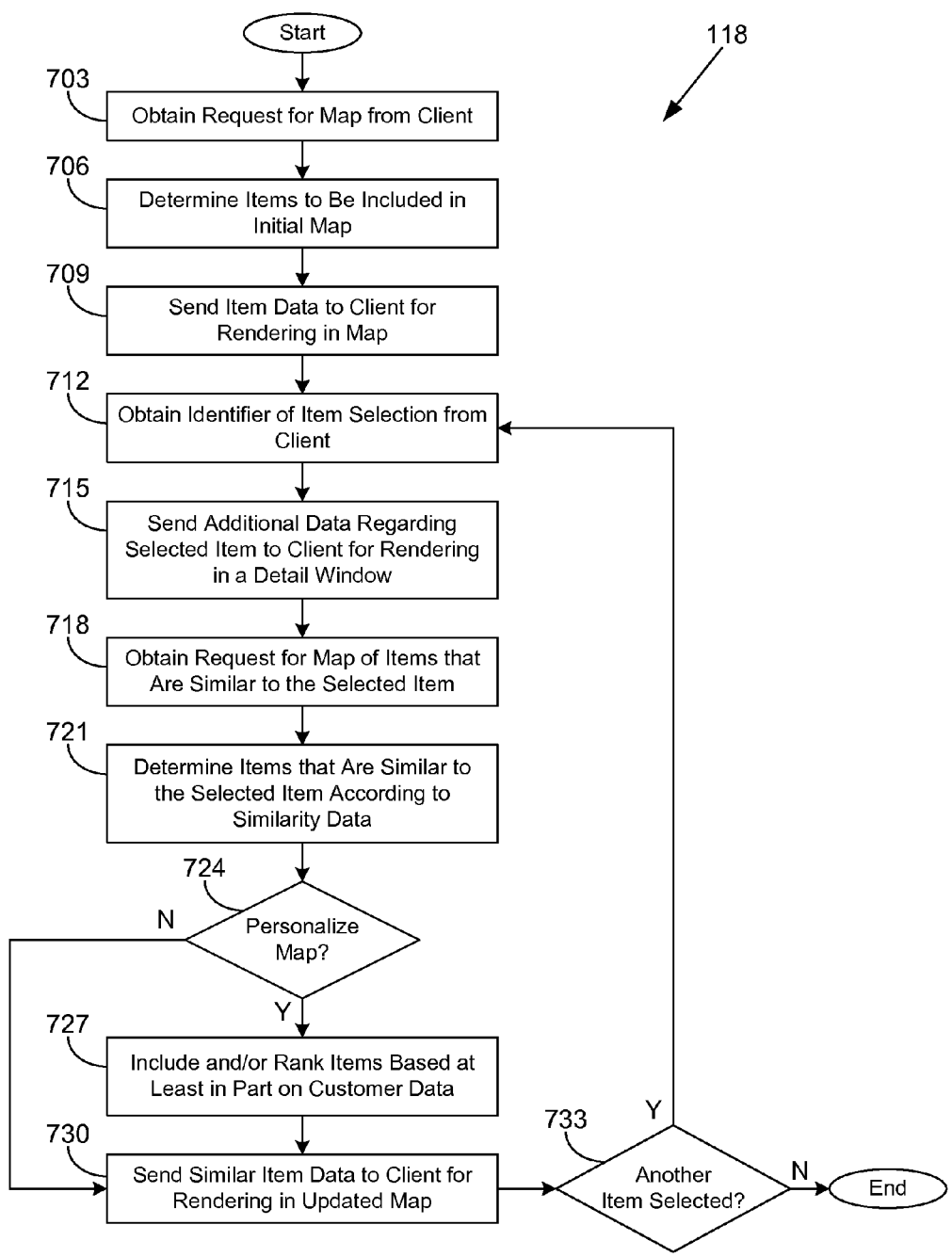
FIG. 7 is a flowchart illustrating one example of functionality implemented as portions of a map generation application executed in a computing device in the networked environment of FIG. 1 according to various embodiments of the present disclosure.

Referring next to FIG. 7, shown is a flowchart that provides one example of the operation of a portion of the map generation application 118 according to various embodiments. It is understood that the flowchart of FIG. 7 provides merely an example of the many different types of functional arrangements that may be employed to implement the operation of the portion of the map generation application 118 as described herein. As an alternative, the flowchart of FIG. 7 may be viewed as depicting an example of steps of a method implemented in the computing device 103 (FIG. 1) according to one or more embodiments.

Beginning with box 703, the map generation application 118 obtains a request for a network page including a map of items 157 (FIG. 1) from a client 106 (FIG. 1) that may be associated with a customer. In box 706, the map generation application 118 determines the items 139 (FIG. 1) that are to be included in the initial map of items 157. Such items 139 may be determined according to best selling items 139, popular items 139, most viewed items 139, relevant items 139 to the customer, and/or other items 139. In box 709, the map generation application 118 sends the item 139 data to the client 106 for rendering in a map of items 157.

Next, in box 712, the map generation application 118 obtains an identifier of an item selection from a client 106. For example, the customer may have clicked or otherwise selected an item representation 206 (FIG. 2). In box 715, the map generation application 118 sends additional data regarding the selected item 139 to the client 106 for rendering in a detail window 303 (FIG. 3).

In box 718, the map generation application 118 obtains a request for a map of items 157 that includes items 139 that are similar to the selected item 139. In response, in box 721, the map generation application 118 determines the items 139 from the catalog that are similar to the selected item 139 according to the item similarity data 136 (FIG. 1). In box 724, the map generation application 118 determines whether the map of items 157 is to be personalized for the customer. If the map of items 157 is to be personalized for the customer, the map generation application 118 proceeds to box 727 and includes items 139 and/or ranks items 139 for inclusion in the map of items 157 based at least in part on customer data 130 (FIG. 1).

The map generation application 118 then proceeds to box 730. If the map generation application 118 determines in box 724 that the map of items 157 is not to be personalized, the map generation application 118 also moves to box 730. In box 730, the map generation application 118 sends data regarding the similar items 139, such as the item representations 506 (FIG. 5), etc., to the client 106 for rendering in an updated map of items 157.

In box 733, the map generation application 118 determines whether another item 139 is selected from the updated map of items 157. If another item 139 is selected, the map generation application 118 returns to box 712 and obtains the identifier of the item 139 selection from the client 106. Otherwise, the portion of the map generation application 118 ends.

Figure 8:
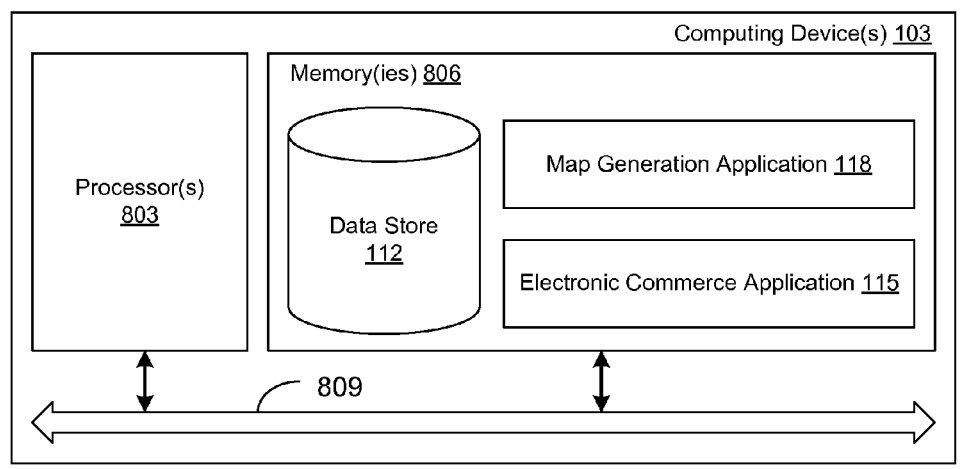
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the electronic commerce application 115, the map generation application 118, and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce application 115, the map generation application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the map generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, and the map generation application 118, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein the program, when executed, causes the computing device to at least:
    generate a map of products that includes images associated with individual products of a first set of products, wherein the map of products is arranged in a grid layout based at least in part on a plurality of product categories;
    determine a selected product according to a selection by a customer of one of the images associated with the first set of products;
    determine a second set of products based at least in part on a similarity of the second set of products to the selected product and data associated with the customer;
    update, in response to the selection by the customer of one of the images associated with the first set of products, the map of products to include images associated with individual products of the second set of products;
    wherein the images associated with individual products of the second set of products are located at a corresponding position within the map of products, the corresponding position being based at least in part on a corresponding degree of similarity of a respective product to the selected product;
    wherein a size of each of the images associated with the second set of products is established based at least in part on the corresponding degree of similarity.

2. The non-transitory computer-readable medium of claim 1, wherein the program when executed further causes the computing device to at least select the first set of products from a product catalog according to a measure of product popularity.

3. A computer-implemented method, comprising:
    generating, in at least one computing device, a first map of items that includes graphical representations of individual items of a first set of items;
    determining, in the at least one computing device, a selected item according to a selection of one of the graphical representations of the first set of items;
    determining, in the at least one computing device, a second set of items based at least in part on a similarity of the second set of items to the selected item;
    generating, in the at least one computing device, in response to the selection of the one of the graphical representations of the first set of items, a second map of items that includes graphical representations of individual items of the second set of items; and
    wherein the graphical representations of the individual items of the second set of items are located at a corresponding position within the second map of items, the corresponding position being based at least in part on a corresponding degree of similarity of a respective item to the selected item.

4. The computer-implemented method of claim 3, further comprising:
    identifying, in the at least one computing device, a customer; and
    determining, in the at least one computing device, the second set of items based at least in part on data associated with the customer.

5. The computer-implemented method of claim 3, wherein the first set of items are arranged in a grid layout according to a plurality of item categories.

6. The computer-implemented method of claim 3, wherein a representation of an item rating is configured to be rendered in association with a corresponding one of the graphical representations.

7. The computer-implemented method of claim 3, wherein graphical representations corresponding to a first portion of the first set of items are configured to be initially included in a viewport of a browser, and graphical representations corresponding to a second portion of the first set of items are configured to be initially excluded from the viewport.

8. The computer-implemented method of claim 3, further comprising rendering, in the at least one computing device, the first map of items after rendering the second map of items in response to a user request.

9. The computer-implemented method of claim 3, further comprising:
    determining, in the at least one computing device, another selected item according to a selection of one of the graphical representations of the second set of items;
    determining, in the at least one computing device, a third set of items based at least in part on similarity of the third set of items to the another selected item;
    generating, in the at least one computing device, a third map of items that includes graphical representations of individual items of the third set of items; and
    wherein the graphical representations of individual items of the third set of items are located at a corresponding position within the third map of items, the corresponding position within the third map of items being based at least in part on a corresponding degree of similarity of a respective item to the another selected item.

10. A system, comprising:
at least one first computing device, configured to at least
obtain a request for a map of items from a second computing device; and
send code for generating the map of items to the second computing device in response to the request, the code for generating the map of items, when executed, causing the second computing device to at least:
generate the map of items, the map of items including a first plurality of items associated with individual items of a plurality of item categories;
obtain a user selection of one of the items in the map of items;
update, in response to the user selection of the one of the items in the map of items, the map of items to include a second plurality of items that are similar to the one of the items in the map of items; and
wherein individual items of the second plurality of items are located at a corresponding position within the map of items, the corresponding position being based at least in part on a corresponding degree of similarity of a respective one of the second plurality of items to the one of the items in the map of items.

11. The system of claim 10, wherein the code for generating the map of items is embedded in a network page.

12. The system of claim 10, wherein the updating further comprises replacing the first plurality of items other than the one of the items with the second plurality of items in the map of items.

13. The system of claim 10, wherein a size of a respective image in the map of items and associated with the individual items of the second plurality of items is established based at least in part on the corresponding degree of similarity.

14. The system of claim 10, wherein a distance from a reference image of a respective image in the map of items and associated with the individual items of the second plurality of items is established based at least in part on the corresponding degree of similarity, and the reference image is associated with the one of the items.

15. The system of claim 10, wherein the code for generating the map of items further causes the second computing device to at least render a detail window that includes additional information about the one of the items in the map of items in response to the user selection.

16. The system of claim 15, wherein the detail window includes a component for updating the map of items.

17. The system of claim 10, wherein the at least one first computing device is further configured to at least:
obtain an identifier of the one of the items in the map of items from the client;
determine the second plurality of items; and
send data including graphical representations of at least some of the second plurality of items to the client.

18. The system of claim 17, wherein the at least one first computing device is further configured to at least:
identify a customer associated with the client; and
wherein the second plurality of items are determined based at least in part on data associated with the customer.

19. The system of claim 18, wherein the data associated with the customer includes browse history data.

20. The system of claim 18, wherein the data associated with the customer includes order history data.

21. The system of claim 10, wherein the map of items includes a graphical representation of the individual items of the first plurality of items or the second plurality of items arranged in a grid layout.

22. The system of claim 21, wherein a first axis of the grid layout corresponds to the item categories, and a second axis of the grid layout corresponds to those of the first plurality of items or the second plurality of items associated with the respective item category.

23. The system of claim 10, wherein the code for generating the map of items further causes the second computing device to at least:
obtain a user request to save a current state of the map of items; and
update a user interface that facilitates a selection of one of a plurality of states of the map of items to include the current state of the map of items.

* * * * *